US012669135B2

(12) United States Patent
Bruck et al.

(10) Patent No.: US 12,669,135 B2
(45) Date of Patent: Jun. 30, 2026

(54) PILOT-CONTROL ELECTROMAGNETIC VALVE

(71) Applicant: HYDAC Fluidtechnik GmbH, Sulzbach (DE)

(72) Inventors: Peter Bruck, Althornbach (DE); Christian Groh, Gersheim (DE); Frank Schulz, Blieskastel-Bierbach (DE); Andre Jäger, Sangerhausen (DE); Lennard Günther, Dresden (DE); Jan Frederik Lübbert, Dresden (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 141 days.

(21) Appl. No.: 18/836,960

(22) PCT Filed: Jan. 10, 2023

(86) PCT No.: PCT/EP2023/050412
§ 371 (c)(1),
(2) Date: Aug. 8, 2024

(87) PCT Pub. No.: WO2023/165745
PCT Pub. Date: Sep. 7, 2023

(65) Prior Publication Data
US 2025/0137548 A1 May 1, 2025

(30) Foreign Application Priority Data
Mar. 4, 2022 (DE) ..................... 10 2022 000 767.3

(51) Int. Cl.
F16K 31/42 (2006.01)
F15B 13/043 (2006.01)

(52) U.S. Cl.
CPC ........ F15B 13/0433 (2013.01); F16K 31/423 (2013.01)

(58) Field of Classification Search
CPC ................................................... F16K 31/0423
See application file for complete search history.

(56) References Cited

U.S. PATENT DOCUMENTS

| | | | |
|---|---|---|---|
| 4,535,966 A | 8/1985 | Post | |
| 6,886,802 B2 * | 5/2005 | Bartolacelli | .......... F16K 31/408 |
| | | | 251/129.15 |

(Continued)

FOREIGN PATENT DOCUMENTS

| | | |
|---|---|---|
| DE | 10323595 A1 | 12/2004 |
| DE | 112006002306 T5 | 7/2008 |

(Continued)

OTHER PUBLICATIONS

Search Report for International Application No. PCT/EP2023/050412, 5 pp. May 8, 2023.

*Primary Examiner* — Umashankar Venkatesan
(74) *Attorney, Agent, or Firm* — Slayden Grubert Beard PLLC

(57) ABSTRACT

The disclosure relates to a valve, comprising a main plunger for controlling a main volume flow and comprising a pilot-control plunger for controlling a pilot-control volume flow. The main and pilot-control plungers are longitudinally moveably guided in a valve housing and the pilot-control plunger can be actuated by a magnetic device. The position of the main plunger can be adjusted by the pilot-control plunger in that a fluid pressure at the main plunger is communicated, via a fluid connection, into the pilot control chamber containing the pilot-control piston, which keeps the main plunger in its closed position blocking the main volume flow when the magnetic device is not actuated. When the magnetic device is actuated, the pilot-control (Continued)

plunger moves into a position in which the fluid pressure falls in the pilot-control chamber until the main plunger moves into an open position controlling the main volume flow.

20 Claims, 3 Drawing Sheets

(56)                    References Cited

U.S. PATENT DOCUMENTS

| | | | | |
|---|---|---|---|---|
| 7,921,880 | B2 * | 4/2011 | Jackson | ................ F16K 31/408 |
| | | | | 137/881 |
| 9,777,844 | B2 * | 10/2017 | Bruck | ................... F16K 31/408 |
| 12,055,225 | B2 * | 8/2024 | Shimada | ................... F16K 1/54 |
| 2006/0273270 | A1 | 12/2006 | Bill | |
| 2007/0044649 | A1 * | 3/2007 | Smith | ................... F15B 13/024 |
| | | | | 91/418 |
| 2010/0155633 | A1 | 6/2010 | Pfaff | |
| 2010/0294962 | A1 * | 11/2010 | Bill | ....................... F16K 31/408 |
| | | | | 251/30.01 |
| 2015/0323083 | A1 | 11/2015 | Bruck | |
| 2025/0207683 | A1 * | 6/2025 | Bruck | ................ F15B 13/0433 |

FOREIGN PATENT DOCUMENTS

| | | | |
|---|---|---|---|
| DE | 102009055802 | A1 | 7/2010 |
| DE | 102012014250 | A1 | 1/2014 |
| EP | 0083688 | B1 | 8/1986 |
| EP | 2880315 | B1 | 9/2017 |

* cited by examiner

PILOT-CONTROL ELECTROMAGNETIC VALVE

CROSS-REFERENCE TO RELATED APPLICATIONS

This application claims priority to German Patent Application No. DE 10 2022 000 767.3, filed on Mar. 4, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a valve, in particular a proportional valve, comprising a main piston for actuating a main volumetric flow and a pilot piston for actuating a pilot volumetric flow, the main piston and pilot piston being guided in a valve housing in a longitudinally movable manner and it being possible to actuate the pilot piston by means of a solenoid device.

Pilot-operated directional-control valves with electro-hydraulic actuation control the start, stop and direction of a volumetric flow as well as the speed, acceleration and deceleration of a hydraulic consumer connected to the valve, for example in the form of a hydraulic working cylinder. Pilot-operated directional-control valves are generally used where large volumetric flows are controlled with low flow losses. However, low flow losses at high volumetric flows mean large opening cross-sections and therefore large strokes of the main piston. Disturbances which impair the valve function are the flow and friction forces which counteract the switching movement and are dependent on the volumetric flow and differential pressure, i.e., the valve performance. Particularly in the case of mechanical actuation by a spring, usually in the form of a return spring, the rated value of the spring force may be too small compared to the frictional force for resetting the piston slide valve. To meet these demands on the solenoid system in terms of stroke and force, either the solenoid system would have to be dimensioned correspondingly large or the valve would have to be pilot operated hydraulically.

SUMMARY

A need exists to provide an improved valve in terms of their functional behaviour.

The need is addressed by the subject matter of the independent claim(s). Embodiments of the invention are described in the dependent claims, the following description, and the drawings.

DESCRIPTION

Figure 1:
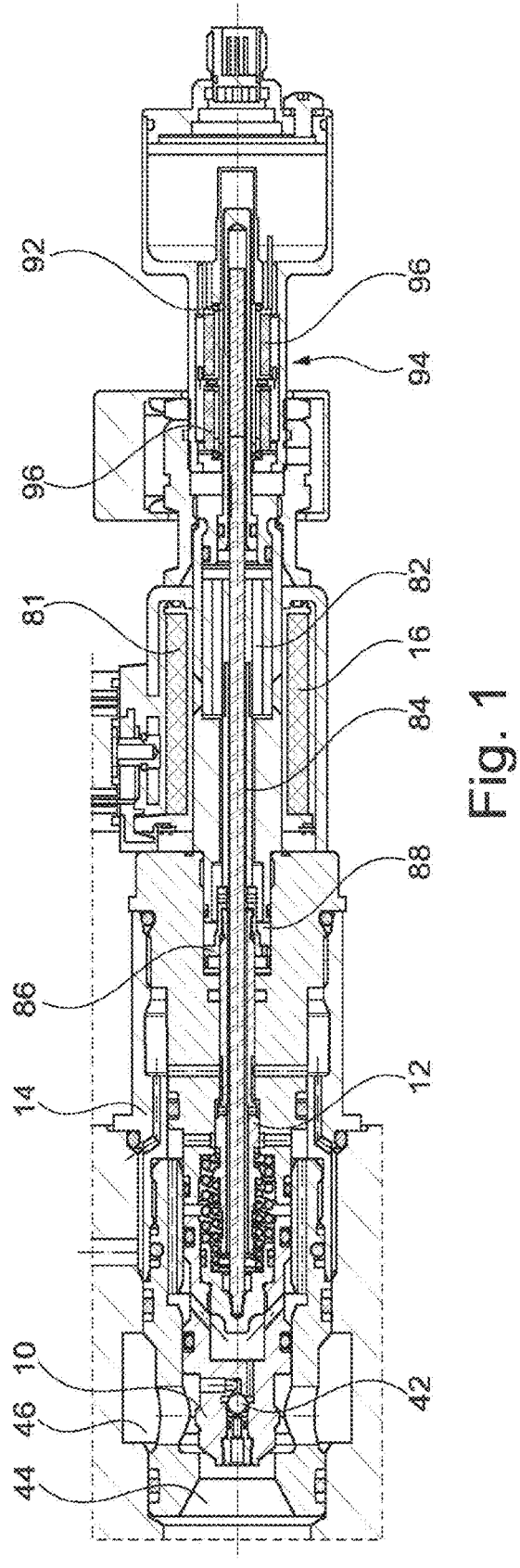
FIG. 1 shows components of an example valve.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one e of ordinary skill in the art that the invention may be practiced without these specific details. In other instances, well-known features have not been described in detail to avoid unnecessarily complicating the instant description.

In some embodiments, the position of the main piston can be adjusted by means of the pilot piston in that a fluid pressure acting on the main piston is signalled via a fluid connection into a pilot chamber with the pilot piston which, when the solenoid device is not actuated, holds the main piston in its closed position preventing the main volumetric flow. When the solenoid device is actuated, the pilot piston moves into a position in which the fluid pressure, decoupled from the pressure supply via the main piston, in the pilot chamber decreases until the main piston reaches an open position which controls the main volumetric flow. An improved quality of control is thus created overall, with low pressure losses while preventing leakages during operation of the valve.

With the valve solution, a linear adjustment of the position of the main piston is achieved in particular via the magnetic force of the solenoid device, with simultaneous compensation of any flow force and sealing friction occurring on the main piston. In some embodiments, the following applies in that the pilot piston can be actuated by the force ($F_{magnet}$) of the solenoid device against the force ($F_{spring1}$) of an energy accumulator, the pilot piston being substantially pressure-balanced taking into account a frictional force ($F_{friction}$), where the following applies:

$$F_{magnet} - F_{spring1} - F_{friction} = 0.$$

Since to this effect the pilot piston is in a balance of forces when the main piston opens to control the main volumetric flow between two possible fluid port points in the valve housing, the stroke of the main piston can be adjusted in this respect via the pilot control. This thus has no equivalent in prior art.

Some embodiments of the valve are the subject of the dependent claims. In some embodiments, the main piston is coupled to a displacement measuring device for detecting its position. Due to the actuation of the main piston via the pilot piston, the valve manages with a solenoid device that is correspondingly small in dimension with reduced opening cross-sections in the region of the volumetric flows to be controlled, for which only small strokes of the main piston are necessary. This results in a highly dynamic proportional throttle valve.

The valve is discussed in greater detail below with reference to an embodiment according to the FIGS. The FIGS. show in principle and not to scale.

Specific references to components, process steps, and other elements are not intended to be limiting. Further, it is understood that like parts bear the same or similar reference numerals when referring to alternate FIGS.

The valve shown in the FIGS. is a so-called proportional valve and has a main piston 10 for controlling a main volumetric flow. Furthermore, a pilot piston 12 is present for controlling a pilot volumetric flow, the main piston 10 and the pilot piston 12 being guided together so as to be longitudinally movable in a valve housing 14. As can be seen in particular from FIG. 1, the pilot piston 12 is arranged by means of a solenoid device 16 so as to be movable in the valve housing 14.

Figure 2:
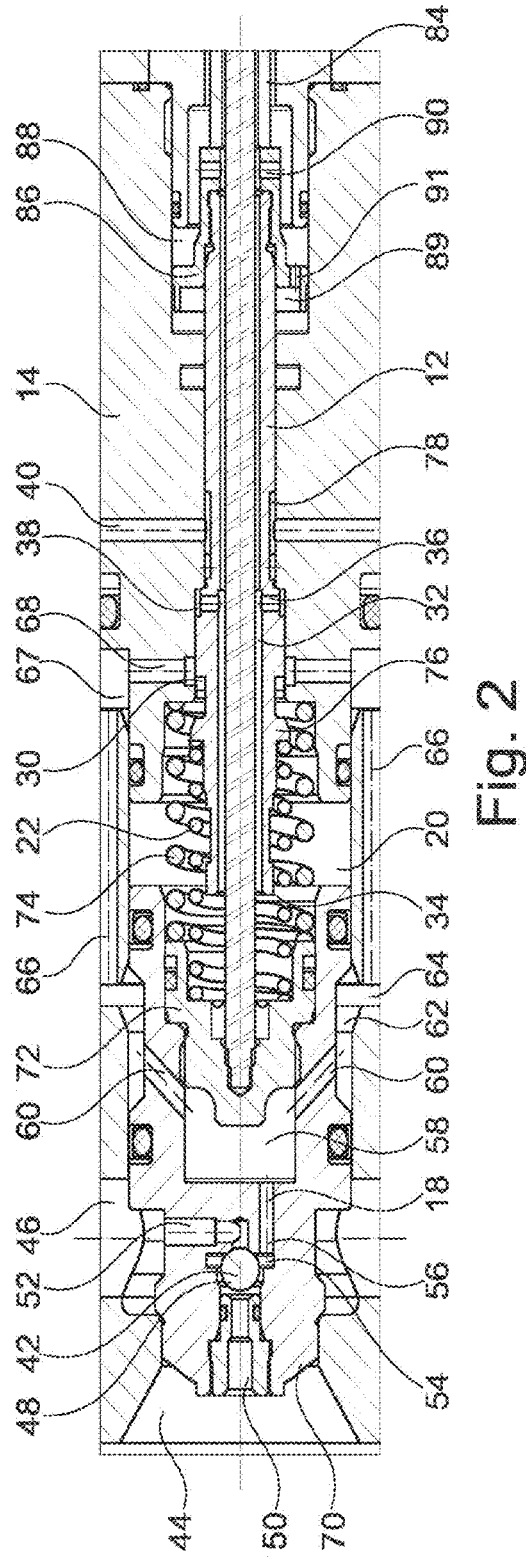
FIG. 2 shows a front part of the example valve according to FIG. 1 in a closed valve position.
Figure 3:
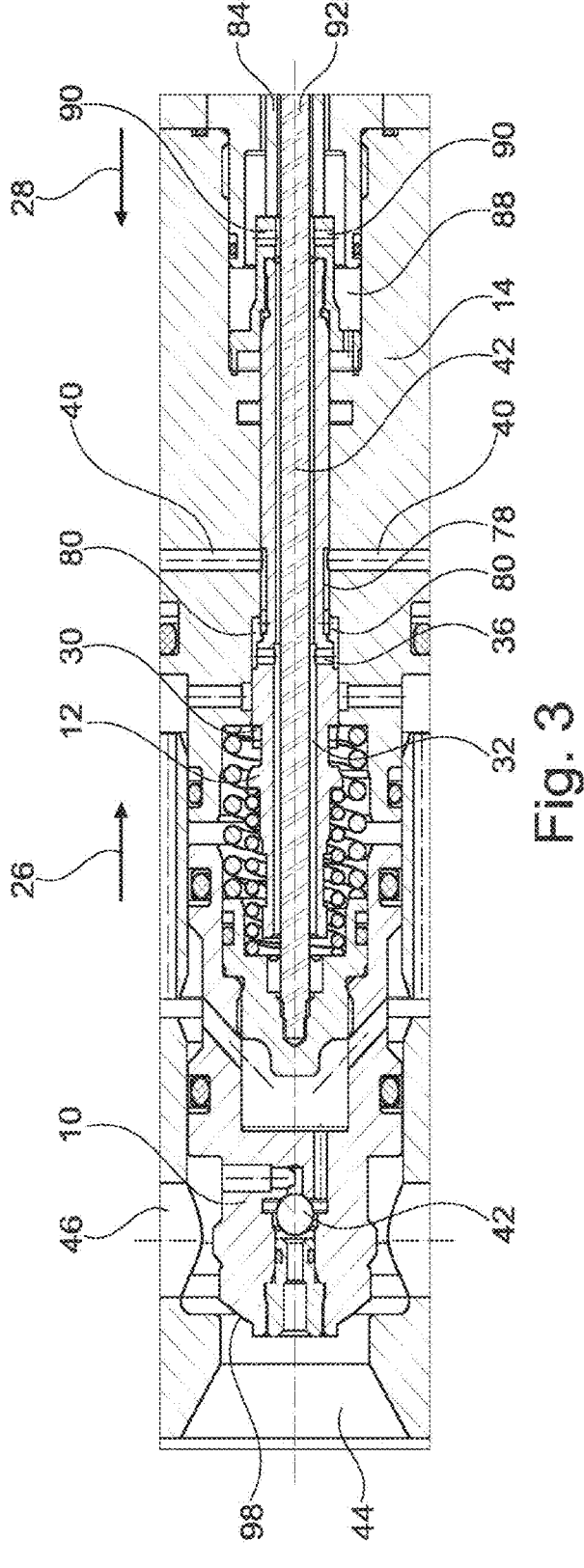
FIG. 3 shows a diagram corresponding to FIG. 2 with the example valve open.

The position of the main piston 10 can be adjusted by means of the pilot piston 12, by signalling a fluid pressure acting on the main piston 10 via a fluid connection 18 into a pilot chamber 20 with the pilot piston 12, which holds the main piston 10 in its closed position preventing the main volumetric flow when the solenoid device 16 is not actuated, as shown in FIG. 2, whereby when the solenoid device 16 is actuated, the pilot piston 12 moves into a position in which the fluid pressure, decoupled from the pressure supply via the main piston 10, in the pilot chamber 20 decreases until the main piston 10 reaches an open position which controls the main volumetric flow, as is shown by way of example for one of the possible open positions in FIGS. 1 and 3.

The pilot piston 12 can be actuated by the force $F_{magnet}$ of the solenoid device 16 against the force $F_{spring1}$ of an energy accumulator in the form of a compression spring 22, the pilot piston 12 being substantially pressure-balanced taking into account a frictional force $F_{friction}$ for the valve, where the following applies:

$$F_{magnet} - F_{spring1} - F_{friction} = 0 \text{ or}$$

$$F_{friction} = 0, \text{ where } x = \frac{F_{magnet} - F_{spring1} - F_{friction}}{c}$$

The opposing forces $F_{spring1}$ and $F_{magnet}$ are indicated in FIG. 3 by force arrows 26 and 28 respectively.

As can also be seen from the FIGS., the pilot piston 12 is configured as a hollow piston which has a first recess 30 on its outer circumference in the manner of an annular groove which, when the solenoid device 16 is not actuated, as shown in the diagram of FIG. 2, establishes the fluid-conducting connection to the main piston 10. The pilot piston 12 configured as a hollow piston has a fluid-conducting channel 32 along its inner circumference, which with its one free end 34 opens out into the pilot chamber 20 and via a radially extending channel section 36 of this axially extending channel 32 opens into a second annular channel-type recess 38 on the outer circumference of the hollow or pilot piston 12, which, when the solenoid device 16 is actuated, as shown in the diagram of FIGS. 1 and 3, moves into a tank port 40 in the valve housing 14 in such a manner that in this respect a fluid-conducting connection to the tank port 40 is established but that the first recess 30 is disconnected from the fluid-conducting connection to the main piston 10. Both the channel section 36 and the tank port 40 can be present multiple times as shown. In any case, connected in the fluid-conducting connection between the main piston 10 and the pilot chamber 20 is a changeover valve 42 which forwards the higher pressure in each case from two fluid ports 44, 46 in the valve housing 14, via which the main volumetric flow to be controlled is routed, into the pilot chamber 20 as a signal pressure.

If the fluid pressure at the fluid port 44 is greater than at the fluid port 46, fluid with this higher pressure reaches the changeover valve 42 with its closing ball 48 via the fluid port 44 and a longitudinal channel 50 in the front region of the main piston 10. In this respect, the aforementioned closing ball 48 is moved to the right as viewed in the direction of the Figures and at the same time closes a radial channel 52 introduced in the main piston 10, which channel opens into the fluid port 46 in the valve housing 14. A further longitudinal channel 56, which with its free face end opens into a fluid chamber 58 in the main piston 10, in turn adjoins the valve chamber 54 of the changeover valve 42 in the main piston 10. The fluid chamber 58 is connected via two connecting channels 60 in the main piston 10, which are arranged at an oblique angle of 45° to the longitudinal axis of the valve, to a further fluid chamber 62 which, configured as an annular chamber, is arranged between the valve housing 14 and the main piston 10. Subsequently, the further fluid chamber 62 merges in a fluid-conducting manner into an annular chamber 64 which is arranged in the valve housing 14 and from there a longitudinal channel section 66 leads into a further annular space 67 and then merges into a transverse channel part 68 in the valve housing 14, which at its inner free end towards the pilot piston 12 is widened in cross-section and which, according to the diagram in FIG. 2, can be brought into fluid overlap with the annular first recess 30 on the outer circumference of the pilot piston 12, it being possible, according to the diagram of FIGS. 1 and 3, to block the aforementioned fluid-conducting connection by moving the pilot piston 12 from right to left under the action of the solenoid device 16. It is understood that the respective channels and other connections, as shown, can be accommodated on the valve body multiple times as required. In any case, the components 50, 52, 54, 56, 58, 60, 62, 64, 66, 67, 68 and 30 form the fluid connection 18 between the fluid port 44 on the end face of the main piston 10 and the pilot chamber 20 between the main piston 10 and the pilot piston 12. In this respect, the pressure at the fluid port 44 is therefore forwarded or signalled further to the pilot chamber 20 in the closed valve position of the main piston 10.

If the pressure at the radial port 46, as the further fluid port in the valve housing 14, is greater than at the fluid port 44, the changeover valve 42 is switched, as viewed in the direction of the Figures, by the closing ball 48 now assuming its left-hand closing position which closes the channel 50. In this way, fluid with predefinable pressure reaches the further longitudinal channel 56 via the fluid port 46 and the radial channel 52 as well as the valve chamber 54, so that in this respect the remaining fluid connection 18 to the pilot chamber 20 is now released via the route thereto. Typically, a fluid pressure from a pressure supply device, such as a hydraulic pump, should be present at the fluid port 44 and a hydraulic consumer, such as a hydraulic cylinder, should be connected to the fluid port. Other assignments of the fluid ports 44, 46 are conceivable.

As further emerges from the FIGS., the main piston 10 is composed of two components 70, 72, the aforementioned components with their free end faces directed towards each other defining the fluid chamber 58, viewed in the axial displacement direction of the valve pistons 10, 12. A second compression spring 74 engages as a further energy accumulator on the free end face of the second component 72, which is directed towards the solenoid device 16, said compression spring being supported with its other free end on stationary parts of the valve housing 14. The compression spring 22 extends on the inner circumference of the second compression spring 74 and coaxial therewith, one free end of said compression spring being supported on a shoulder in the interior of the second component 72 and its other free end being supported on an annular protrusion 76 on the pilot piston 12. In this way, both the main piston 10 and the pilot piston 12 are pre-loaded via the two compression springs 22, 74, the combined spring force of which amounts to $F_{spring1} +$ (x*c) in the preceding formula.

The following now describes how the movement of the main piston 10 is controlled. The movement of the main piston 10 to the right, viewed in the direction of FIG. 2, into a state as shown in FIGS. 1 and 3, takes place as follows. The pressure present at the respective fluid port 44 or 46 upstream of the main piston 10, which is signalled to the pilot piston 12 via the changeover valve 42 and the fluid connection 18, holds the main piston 10 closed due to the pressure in the pilot chamber 20, as shown in the diagram of FIG. 2, via the surface difference formed by the opposing end faces of the main piston 10 when the solenoid device 16 is de-energised.

If the magnetic force now generated by the solenoid device 16 is greater than the frictional force plus the spring force, the pilot piston 12 is moved to the left when viewed in the direction of the Figures and the pressure supply from the main piston 10 is blocked by the aforementioned movement of the pilot piston 12 to the left, in that, as shown in the diagram of FIGS. 1 and 3, the closed outer circumference of the pilot piston 12 closes the transverse channel part 68 in the valve housing 14. In the aforementioned closed position, however, the pilot chamber 20 is connected to the tank via the second recess 38 of the fluid-conducting channel 32 in the pilot piston 12 via the two tank port holes 40 extending radially in the valve housing 14, the free ends of which open in each case into a recessed annular channel 78 on the outer circumference of the pilot piston 12 in each of its travel positions. This annular channel 78 merges into a relief chamber 80, the volume of which in this respect is increased as soon as the pilot piston 12 moves to the left, which establishes the fluid-conducting connection from the pilot chamber 20 to the respective tank port 40 via the fluid-conducting components 32, 36, 80, 78. By connecting the pilot volume to the tank in this way, the pressure in the pilot chamber 20 drops and a new equilibrium is established at the valve until complete closure of the valve is achieved.

In particular, the overall situation is as follows. The magnetic force is reduced so that the pilot piston 12 opens the port to the pressure supply of the main piston 10. This increases the pilot pressure and therefore also the compressive force in the pilot chamber 20. As a result, the main piston 10 again moves from right to left which causes the spring force of the compression springs 22 and 74 to decrease, so that a new equilibrium is established according to the formula below:

to $$F_{magnet} - F_{spring1} - F_{friction} = F_{magnet} - (F_{sping1} + x*c) - F_{friction} = 0.$$

The solenoid device 16 used to actuate the pilot piston 12 has an energisable coil 81 in the usual manner which, in the energised state, moves a solenoid armature 82 from right to left, with the latter forcibly driving with it the pilot piston 12 via a hollow actuating rod 84 and a coupling 86. For unobstructed movement of the pilot piston 12, it is provided among other things that the coupling 86, which is guided in a freely movable manner in a coupling chamber 88 of the valve housing 14, is connected to the fluid-conducting channel 32 in a fluid-conducting manner via radial transverse drilled holes 90, so that the pressure in the pilot chamber 20 is also present in the coupling chamber 88 via the channel 32 and the transverse drilled holes 90 (FIG. 3), which pressure in this respect is passed on in a pressure-equalising manner to the solenoid system of the actuating solenoid, in the form of the solenoid device 16, via the hollow actuating rod 84 in a pressure-conducting manner on the outer circumference and the inner circumference. The said component 86 is a kind of dead space 89 when viewed from the left in the direction of FIG. 2.

This space 89 is filled or emptied via at least one drilled hole 91 in the component 86, so that the dynamics or damping of the valve can be adjusted via the respective drilled hole 91 in the component 86.

Furthermore, a measuring rod 92 is fixedly arranged on the second component 72 of the main piston 10, which measuring rod extends through both the pilot piston 12 and the actuating solenoid system in order to open out with its other free end region into a displacement measuring device, denoted as a whole by 94, which is provided with two measuring coils 96 so that the displacement movement for the main piston 10 can be measured in both directions.

A displacement measuring system of this type is disclosed by way of example for a pressure compensator in DE 10 2012 014 250 A1.

In some embodiments, the main piston 10 has, on its free face end, a convex end face 98 formed of a predefinable radius which serves to establish a linear relationship between the stroke of the main piston 10 and the opening surface it produces at the fluid ports 44 or 46 as shown in FIG. 2. Otherwise, the main piston 10 is movably guided via stepped annular surfaces so as to be longitudinally movable on the inner circumference of the valve housing 14 and individual sealing ring systems, regularly in the form of conventional rings, O-sealing ensure fluid-tight delimitation of the individual fluid spaces and fluid routes, as indicated above.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A valve, comprising a main piston for actuating a main volumetric flow and a pilot piston for actuating a pilot volumetric flow; wherein the main piston and pilot piston are guided so as to be longitudinally movable in a valve housing; wherein the pilot piston can be actuated using a solenoid device; wherein the position of the main piston can be adjusted using the pilot piston in that a fluid pressure acting on the main piston is signalled into a pilot chamber with the pilot piston via a fluid connection, which pilot piston, when an actuated solenoid device is in an actuating position, holds the main piston in its closed position preventing the main volumetric flow; wherein when the solenoid device is actuated, the pilot piston moves into a position in which the fluid pressure, decoupled from the pressure supply via the main piston, in the pilot chamber decreases until the main piston reaches an open position which controls the main volumetric flow; and wherein the pilot piston is configured as a hollow piston which has a first recess on its outer circumference which, when the solenoid device is not actuated, establishes the fluid-conducting connection to the main piston and, with its inner circumference, forms a fluid-conducting channel, which with its one free end opens out into the pilot chamber and which via a channel section of this channel opens into a second recess on the outer circumference of the hollow piston, which, when the solenoid device is actuated moves into a tank port in the valve housing in such a manner that the first recess is disconnected from the fluid-conducting connection to the main piston.

2. The valve of claim 1, wherein the pilot piston can be actuated by a force F_magnet of the solenoid device against a force F_spring1 of an energy accumulator, wherein the pilot piston is substantially pressure-balanced taking into account a frictional force $$F\_friction, \text{ wherein } F\_magnet - F\_spring1 - F\_friction = 0.$$

3. The valve of claim 2, wherein the pilot piston is configured as a hollow piston which has a first recess on its outer circumference which, when the solenoid device is not actuated, establishes the fluid-conducting connection to the main piston and, with its inner circumference, forms a fluid-conducting channel, which with its one free end opens out into the pilot chamber and which via a channel section of this channel opens into a second recess on the outer circumference of the hollow piston, which, when the solenoid device is actuated moves into a tank port in the valve housing in such a manner that the first recess is disconnected from the fluid-conducting connection to the main piston.

4. The valve of claim 2, wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

5. The valve of claim 2, wherein, as part of the fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

6. The valve of claim 2, wherein at least one further connecting channel is arranged in the pilot piston and in the valve housing, using which the second recess on the pilot piston can be connected to a tank.

7. The valve of claim 1, wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

8. The valve of claim 7, wherein, as part of the fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

9. The valve of claim 7, wherein at least one further connecting channel is arranged in the pilot piston and in the valve housing, using which the second recess on the pilot piston can be connected to a tank.

10. The valve of claim 1, wherein, as part of the fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

11. The valve of claim 1, wherein at least one further connecting channel is arranged in the pilot piston and in the valve housing, using which the second recess on the pilot piston can be connected to a tank.

12. The valve of claim 1, wherein the main piston is held towards its closed position using a further energy accumulator.

13. The valve of claim 1, wherein the respective energy accumulator is formed of a compression spring and wherein the compression spring for the main piston, with higher spring stiffness than the compression spring for the pilot piston, encompasses the latter.

14. The valve of claim 1, wherein the main piston, which is formed at least partially convex on its free end face, has a radius for establishing a linear relationship between the stroke of the main piston and the opening surface it produces at one of the fluid ports in the valve housing.

15. The valve of claim 1, wherein a measuring rod passes through the pilot piston, which measuring rod, connected to the main piston, is part of a displacement measuring device for the main piston.

16. The valve of claim 1, wherein the valve is a proportional valve.

17. A valve, comprising a main piston for actuating a main volumetric flow and a pilot piston for actuating a pilot volumetric flow; wherein the main piston and pilot piston are guided so as to be longitudinally movable in a valve housing; wherein the pilot piston can be actuated using a solenoid device; wherein the position of the main piston can be adjusted using the pilot piston in that a fluid pressure acting on the main piston is signaled into a pilot chamber with the pilot piston via a fluid connection, which pilot piston, when an actuated solenoid device is in an actuating position, holds the main piston in its closed position preventing the main volumetric flow; wherein when the solenoid device is actuated, the pilot piston moves into a position in which the fluid pressure, decoupled from the pressure supply via the main piston, in the pilot chamber decreases until the main piston reaches an open position which controls the main volumetric flow; and wherein a changeover valve is connected in the fluid-conducting connection between the main piston and the pilot chamber, which valve forwards the respectively higher pressure of two fluid ports in the valve housing, via which the main volumetric flow is guided, into the pilot chamber as the signal pressure.

18. A valve, comprising a main piston for actuating a main volumetric flow and a pilot piston for actuating a pilot volumetric flow; wherein the main piston and pilot piston are guided so as to be longitudinally movable in a valve housing; wherein the pilot piston can be actuated using a solenoid device; wherein the position of the main piston can be adjusted using the pilot piston in that a fluid pressure acting on the main piston is signaled into a pilot chamber with the pilot piston via a fluid connection, which pilot piston, when an actuated solenoid device is in an actuating position, holds the main piston in its closed position preventing the main volumetric flow; wherein when the solenoid device is actuated, the pilot piston moves into a position in which the fluid pressure, decoupled from the pressure supply via the main piston, in the pilot chamber decreases until the main piston reaches an open position which controls the main volumetric flow; and wherein as part of the fluid connection, a fluid chamber is created in the main piston, which chamber opens out via at least one connecting channel in the main piston into a further fluid chamber between the valve housing and the main piston, which chamber opens out via at least one further connecting channel in the valve housing with at least a partial overlap into the first recess in the pilot piston.

19. A valve, comprising a main piston for actuating a main volumetric flow and a pilot piston for actuating a pilot volumetric flow; wherein the main piston and pilot piston are guided so as to be longitudinally movable in a valve housing; wherein the pilot piston can be actuated using a solenoid device; wherein the position of the main piston can be adjusted using the pilot piston in that a fluid pressure acting on the main piston is signaled into a pilot chamber with the pilot piston via a fluid connection, which pilot piston, when an actuated solenoid device is in an actuating position, holds the main piston in its closed position preventing the main volumetric flow; wherein when the solenoid device is actuated, the pilot piston moves into a position in which the fluid pressure, decoupled from the pressure supply via the main piston, in the pilot chamber decreases until the main piston reaches an open position which controls the main volumetric flow; and wherein at least one further connecting channel is arranged in the pilot piston and in the valve housing, using which the second recess on the pilot piston can be connected to a tank.

20. A valve, comprising a main piston for actuating a main volumetric flow and a pilot piston for actuating a pilot volumetric flow; wherein the main piston and pilot piston are guided so as to be longitudinally movable in a valve housing; wherein the pilot piston can be actuated using a solenoid device; wherein the position of the main piston can be adjusted using the pilot piston in that a fluid pressure acting on the main piston is signaled into a pilot chamber with the pilot piston via a fluid connection, which pilot piston, when an actuated solenoid device is in an actuating position, holds the main piston in its closed position preventing the main volumetric flow; wherein when the solenoid device is actuated, the pilot piston moves into a position in which the fluid pressure, decoupled from the pressure supply via the main piston, in the pilot chamber decreases until the main piston reaches an open position which controls the main volumetric flow; and wherein a measuring rod passes through the pilot piston, which measuring rod, connected to the main piston, is part of a displacement measuring device for the main piston.

* * * * *